United States Patent

[11] 3,554,080

[72] Inventor Fritz Herrmann
 Dietikon, Switzerland
[21] Appl. No. 790,079
[22] Filed Jan. 9, 1969
[45] Patented Jan. 12, 1971
[73] Assignee Fritz Bachtold
 Baltenswil, Switzerland
[32] Priority Jan. 12, 1968
[33] Switzerland
[31] No. 475/68

[54] CUTTER MANDREL
 4 Claims, 1 Drawing Fig.
[52] U.S. Cl. .................................................... 90/11,
 77/60, 77/71, 279/16, 279/96
[51] Int. Cl. ..................................................... B23c 9/00,
 B23b 31/10

[50] Field of Search........................................... 90/11.1, 11;
 279/1-R, 16, 95, 96, 102, 103; 82/44; 77/71X,
 60X

[56] References Cited
 UNITED STATES PATENTS
 3,159,081 12/1964 Erikson ..................... 77/71-X
 3,198,079 8/1965 Winnen ..................... 90/11-1

Primary Examiner—Gil Weidenfeld
Attorney—Werner W. Kleeman

ABSTRACT: There is disclosed a cutter mandrel or arbor for centering and attaching cutting tools to the spindle of machine tools, especially milling machines. The mandrel of the invention comprises a central body member equipped with flange means and a substantially cylindrical portion at the region of said flange means. A substantially conical sleeve member is mounted for lengthwise movement upon the cylindrical portion.

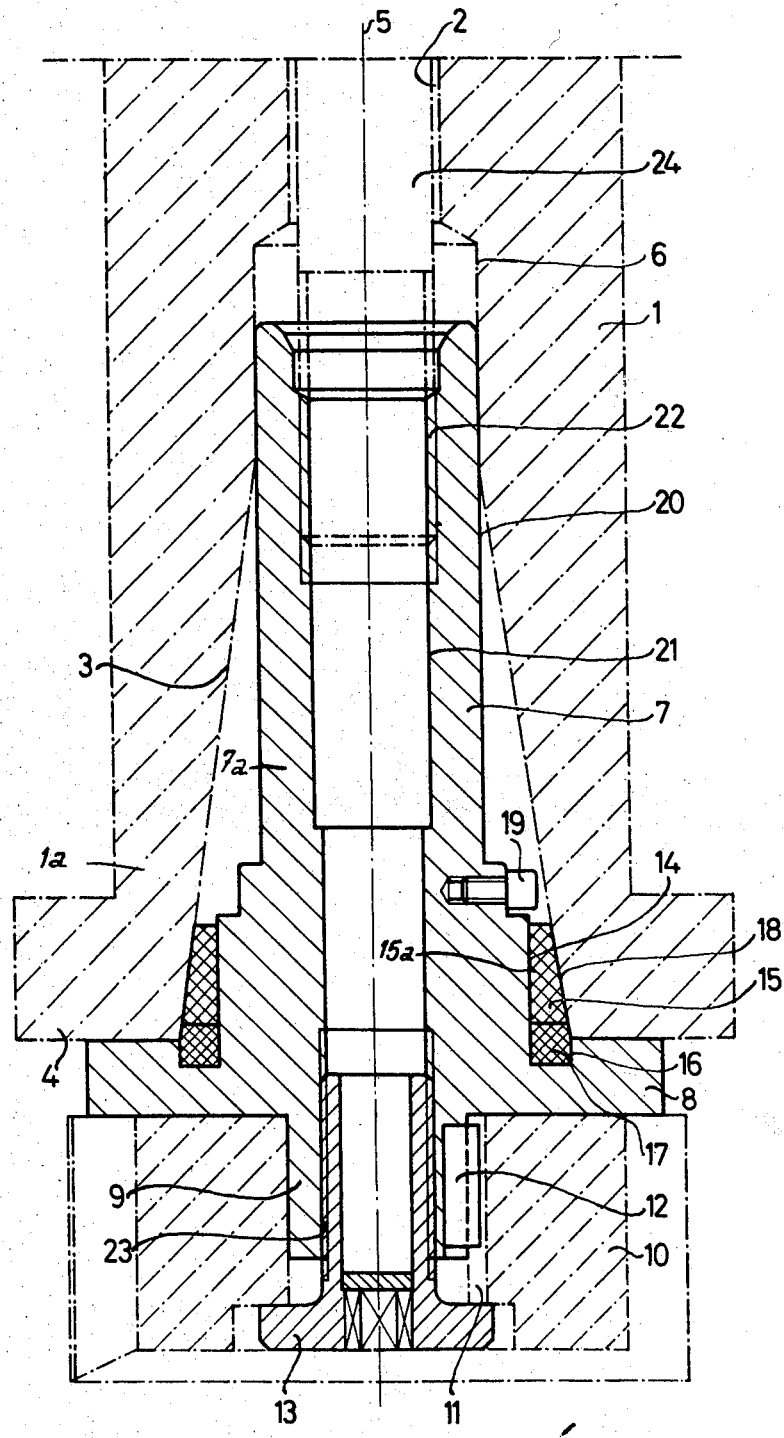

CUTTER MANDREL

BACKGROUND OF THE INVENTION

The present invention relates to an improved cutter mandrel or arbor for centering and securing the cutters or milling tools in the spindles of machine tools, especially milling or shaping machines.

Cutter mandrels for centering and attaching cutters or milling tools at the spindles of machine tools constitute a tool which is extensively used nowadays. The builders of machine tools, as well as also the manufacturers of cutter mandrels have agreed to certain standards, so that the mandrels can be used at practically all of the machine tool spindles.

The spindles of machine tools which are designed to receive the cutter mandrels are provided at their end with a conical bore. The latter is produced very exactly and complies with the highest requirements regarding its truth in rotation as well as its accuracy in shape. The mandrel possesses the same conical form and is introduced into the conical bore of the machine spindle. A tensioning screw is introduced from the rear through the hollow spindle and serves to retract the cone of the mandrel until it is rigidly mounted in the conical bore of the spindle. The forward end of the mandrel protruding out of the spindle possesses a flange as well as a cylindrical hub, upon which the cutter or milling tool is mounted. This cutter or milling tool is fixedly pressed against the flange of the mandrel by means of a tensioning screw and, thus, is retained in its position.

Since the manufacturers of machine tools attempt to produce their spindles with a very exactly formed conical bore, and since also the manufacturers of the mandrels strive to produce the corresponding cone with extreme accuracy, the introduction of the mandrel into the spindle of the machine tools should provide a very exact centering and an exact planar position of the cutter or milling tool. However, practice has shown that the positional accuracy of the cutters or milling tools leave a great deal to be desired. Consequently, during the milling operation there occurs the well known chattering of the tool, the unclean surface and a premature wearing of the tool. Additionally, the feed movements during machining must be maintained small.

The cause of these occurances is that the conical bore of the machine tool and the cone of the mandrel do not possess the same exact form. Both cones bear upon one another along a rather lengthy path, and thus, even slight deviations in shape are sufficient for the axis of the attachment hub for the milling tool to no longer align exactly with the spindle axis, so that the known disadvantageous operating conditions occur.

SUMMARY OF THE INVENTION

Accordingly, it is the primary object of the present invention to provide an improved mandrel for shaping machines which effectively overcomes the aforementioned drawbacks of the prior art constructions.

Another, more specific object of the present invention is to provide an improved cutter mandrel which effectively prevents the occurrence of the aforementioned disadvantageous conditions during the milling operation, and which provides for a very exact centering of the milling tool or cutter and an exact aligned position with respect to the axis of the spindle.

Now, in order to implement these and still further objects of the invention, which will become more readily apparent as the description proceeds, the mandrel designed according to the teachings of the invention is manifested by the features that is comprises a central body member which at the region of its flange possesses a substantially cylindrical portion upon which is guided for lengthwise movement a substantially conical sleeve member.

In the working position of the mandrel, the flange of the central body member bears against the front end of the spindle of the machine tool.

According to another aspect of the invention the conical sleeve member preferably bears against an elastic ring member which is inserted in an annular groove. Additionally, the lengthwise movement of the conical sleeve member is advantageously limited by appropriate stop or impact means. In order to maintain a small play, the cylindrical portion of the central body member which provides a guide means and the cylindrical bore of the conical sleeve member are advantageously lapped.

BRIEF DESCRIPTION OF THE DRAWING

The invention will be better understood, and objects other than those set forth above, will become apparent, when consideration is given to the following detailed description thereof. Such description makes reference to the annexed drawing wherein there is shown in schematic sectional view a preferred embodiment of inventive mandrel which is depicted in its work position at the conical bore of the spindle of a machine tool.

DESCRIPTION OF THE PREFERRED EMBODIMENTS

Describing now the drawing, in the single FIG. numeral 1a designates the forward end of a spindle 1 of a machine tool, this spindle being bored hollow throughout its entire length and possessing a lengthwise bore 2. It will be seen that at the end of the spindle 1 this lengthwise bore 2 communicates with a conical bore 3, the latter serving to receive the cutter or milling mandrel 7, and therefore, such is constructed quite exactly. Similarly, the front end face 4 of the spindle 1 is machined very accurately and is situated exactly perpendicular to the spindle axis 5. Furthermore, it will be recognized by referring to the drawing that the conical bore 3 of the spindle 1, prior to merging with the lengthwise bore 2 at such spindle, communicates with a cylindrical bore portion 6. However, this cylindrical bore portion 6 is machined less accurately than the conical bore 3 and the end face 4, and therefore does not assume any centering or guiding functions.

Considering now the cutter or milling mandrel 7 in greater detail, it will be recognized that such embodies a central body member 7a equipped at its front end with a flange 8, as well as a cylindrical hub 9. The flange 8 and hub 9 serve for the mounting of the cutter or milling tool 10. The milling tool 10 is equipped with a keyway 11 with which engages a key 12, or equivalent structure, which is retained at the hub 9, and therefore the keyway 11 and the key 12 positively ensure for the entrainment of the milling or cutter tool 10. By means of the tensioning screw 13, or equivalent structure, the milling tool 10 is fixedly pressed against the surface of the flange 8. The construction of the components 8, 9, 12 and 13 serving for attachment purposes is standardized and therefore is the same for all mandrels.

Additionally, it will be seen that the central body member 7a of the mandrel 7 possesses at the region of the flange 8 a cylindrical portion 14 upon which there is guided for lengthwise movement a conical sleeve member 15. An annular or ring-shaped groove 16 is machined at the corner between the cylindrical portion 14 and the flange 8. An elastic ring member 17 is inserted in this annular groove 16. This elastic ring member 17 can be constructed as a metallic spring or as a resilient ring formed of plastic or rubber, by way of example. The conical portion 18 of the conical sleeve member 15 possesses exactly the same inclination as the conical bore 3 provided at the spindle 1. An adjustment or positioning screw 19 serves as stop and limiting means for the axial movement of the conical sleeve member 15. Instead of using the adjustment or positioning screw 19, it would be possible to use other types of stop means, for instance a positioning ring or a so-called Seeger ring or circlip.

Further, it will be seen that the cylindrical shaft portion 20 of the central body member 7a of the mandrel 7 terminates at the cylindrical bore portion 6 of the spindle 1. This central body member 7a possesses a lengthwise bore 21 provided at each of its ends with a respective threading or threaded portion 22 and 23, as shown. A tensioning screw 24, or the like, cooperates with the threading 22 and this screw is introduced from the rear through the bore 2 of the spindle 1. This tensioning screw 24 serves to draw the mandrel 7 into its work position, as will be fully explained hereinafter. The tensioning screw 13 is threaded into the other threading 23 and serves to fixedly retain the cutter or milling tool 10.

The mandrel can be brought into its working position in the following manner: The central body member 7a of the mandrel is introduced together with the conical sleeve member 15 into the conical bore 3 of the spindle 1. Thereafter, the tensioning screw 24 is introduced and threaded into the central body member 7a. The latter is thereby pulled in axial direction into the spindle 1 and, specifically, for such length of time until the flange 8 flushly bears against the end face 4 of the spindle 1.

Since the flange 8 bears snugly against the end face 4 of the spindle 1, and therefore, assumes an exactly aligned position to the spindle axis 5, the cutter or milling tool 10, which is pressed by the tensioning screw 13 against the flange 8, also is situated with its axis exactly in the direction of the axis 5 of the spindle 1.

Centering of the central body member 7a of the mandrel 7, is undertaken through the agency of the conical sleeve member 15. During tightening of the central body member 7a by the tensioning screw 24, this sleeve member 15 is pressed by means of the elastic ring member 17 into the conical bore 3 of the spindle 1. The cylindrical bore 15a of the conical sleeve member 15 is guided with a narrow fit upon the cylindrical portion 14 of the central body member 7a, so that in order to obtain the required accuracy the relevant cylindrical portions 14 and 15a are lapped together.

The advantage of the inventive mandrel with respect to one having a conical shaft resides in the fact that for maintaining an exact position the centering operation is indeed performed by the cone, but additionally the exact aligned position is attained due to the bearing of the flange 8 against the end face 4 of the spindle 1 of the machine tool. This is achieved inasmuch as the conical sleeve member 15, which assumes the function of centering the mandrel, is lengthwise displaceable. In mandrels with a conical shaft the centering operation and the aligned position of the bearing surfaces for the cutter or milling tool are only brought about by the cone, whereas, the flange, which is also necessary for such mandrels, cannot come to bear against the end face of the spindle. However, this end face possesses an especially exact machined surface which would be available for maintaining the exact position of the mandrel.

Naturally, the guiding of the conical sleeve member 15 upon the cylindrical portion 14 is of major importance for the accuracy of the mandrel, especially for its centering. Therefore, the accommodation of the conical sleeve member 15 upon the central body member 7 and its cylindrical portion 14 must be achieved with the greatest accuracy. However, it is considerably simpler to exactly produce two cylindrical parts than two cones of such dimension as occur at mandrels. Moreover, with regard to the manufacturing operations, it is also of advantage that the conical sleeve member can be maintained relatively small in size, since for the transmission of the forces which occur, the flange 8 provides an effective assistance or support.

The cylindrical shaft 20 of the central body member 7 extends, as thus shown in the drawing, up to the cylindrical bore 6. The fit used in this instance is relatively large and it is not contemplated to use the bore 6 for guiding the mandrel 7.

Since the mandrel 7 renders possible a more exact mounting of the cutter or milling tool 10, the previously experienced chattering no longer occurs during the milling operation, so that the tool is protected. Additionally, the machined surfaces are therefore cleaner and, furthermore, it is possible to use a greater feed than with the conventional mandrels. Consequently, it is possible to make better use of the capacity of the machine tools.

It should be apparent from the foregoing detailed description, that the objects set forth at the outset to the specification have been successfully achieved.

I claim:

1. A mandrel for centering and attaching cutting tools to the spindle of machine tools, especially milling machines, comprising a central body member equipped with flange means and a substantially cylindrical portion at the region of said flange means, a substantially conical sleeve member mounted for lengthwise movement upon said cylindrical portion and wherein when said mandrel assumes its working position said flange means of said central body member bears against a front end face of the spindle of the machine tool.

2. A mandrel for centering and attaching cutting tools to the spindle of machine tools, especially milling machines, comprising a central body member equipped with flange means and a substantially cylindrical portion at the region of said flange means, a substantially conical sleeve member mounted for lengthwise movement upon said cylindrical portion, an annular groove provided at said central body member, an elastic ring member inserted in said annular groove, said conical sleeve member bearing against said elastic ring member.

3. A mandrel as defined in claim 1, further including stop means for limiting the lengthwise movement of said conical sleeve member.

4. A mandrel as defined in claim 1, wherein said conical sleeve member is provided with a substantially cylindrical bore for fitting said conical sleeve member onto said cylindrical portion of said central body member, said cylindrical portion of said central body member and said cylindrical bore of said conical sleeve member possessing lapped surfaces.